United States Patent [19]

Dils et al.

[11] Patent Number: 4,845,647
[45] Date of Patent: Jul. 4, 1989

[54] METHOD AND APPARATUS FOR DETERMINING TEMPERATURE IN A BLACKBODY RADIATION SENSING SYSTEM

[75] Inventors: Ray R. Dils; Alan K. Winslow, both of Vancouver, Wash.

[73] Assignee: Accufiber, Inc., Vancouver, Wash.

[21] Appl. No.: 694,423

[22] Filed: Jan. 24, 1985

[51] Int. Cl.⁴ .............................................. G01J 5/30
[52] U.S. Cl. ................................. 364/557; 250/227; 250/339; 374/131
[58] Field of Search ................ 364/557, 571; 250/227, 250/339; 374/130, 131, 141, 161, 170

[56] References Cited

U.S. PATENT DOCUMENTS

| | | | |
|---|---|---|---|
| 1,318,516 | 10/1919 | Wallis | 374/125 |
| 1,475,365 | 11/1923 | Schueler et al. | 374/130 |
| 1,639,534 | 8/1927 | Ruben | 374/129 |
| 2,709,367 | 5/1955 | Bohnet | 374/131 |
| 3,051,035 | 8/1962 | Root | 374/131 |
| 3,057,200 | 10/1962 | Wood | 374/129 |
| 3,091,693 | 5/1963 | Rudomanski et al. | 374/129 |
| 3,105,150 | 9/1963 | Duke | 374/131 |
| 3,269,255 | 8/1966 | Shaw | 374/130 |
| 3,309,881 | 3/1967 | Beerman | 374/2 |
| 3,433,052 | 3/1969 | Maley | 374/129 |
| 3,452,598 | 7/1969 | Jones | 374/131 |
| 3,462,224 | 8/1969 | Woods et al. | 374/126 |
| 3,570,277 | 3/1971 | Dorr et al. | 374/131 |
| 3,626,758 | 12/1971 | Stewart et al. | 374/131 |
| 3,698,813 | 10/1972 | Aisenberg | 374/130 |
| 3,745,834 | 7/1973 | Veltze et al. | 374/131 |
| 4,016,761 | 4/1977 | Rozzell et al. | 374/161 |
| 4,220,857 | 9/1980 | Bright | 250/339 |
| 4,313,344 | 2/1982 | Brogardh et al. | 374/131 |
| 4,365,307 | 12/1982 | Tatsuwaki et al. | 364/557 |
| 4,409,476 | 10/1983 | Löfgren et al. | 250/227 |
| 4,437,772 | 3/1984 | Samuliski | 374/129 |
| 4,468,771 | 8/1984 | Zhukov et al. | 374/131 |
| 4,508,461 | 4/1985 | Lambert | 374/170 X |
| 4,558,217 | 12/1985 | Alves | 250/227 |
| 4,576,485 | 3/1986 | Lambert | 374/130 |
| 4,576,486 | 3/1986 | Dils | 374/131 |

OTHER PUBLICATIONS

"High Temperature Optical Fiber Thermometer", R. R. Dils Journal of Applied Physics (3), Mar., 1983.

Primary Examiner—Felix D. Gruber
Attorney, Agent, or Firm—Chernoff, Vilhauer, McClung & Stenzel

[57] ABSTRACT

A system for measuring temperature within a region to be tested includes a sensor means responsive to the temperature within the region for transmitting light energy along an optically-transmissive path and detector and amplifier means responsive to the light energy for producing an output signal which represents the intensity of the light energy. A signal processor electronically calculates a display signal from the output signal which represents the temperature within the test region. The signal processor performs this calcuation by solving Planck's equation, and a successive bisection technique is utilized to achieve extremely fine resolution of the temperature.

3 Claims, 5 Drawing Sheets

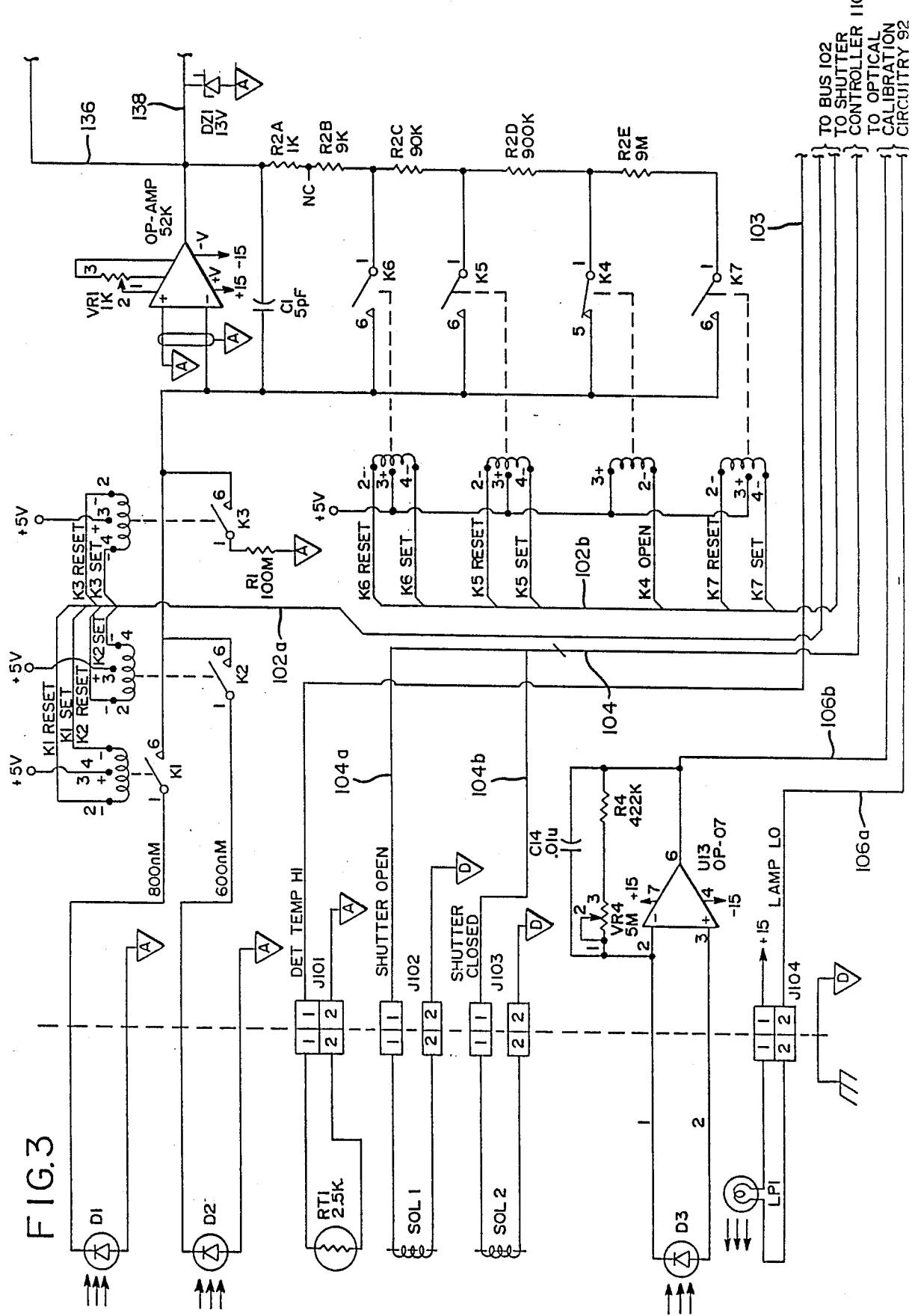

METHOD AND APPARATUS FOR DETERMINING TEMPERATURE IN A BLACKBODY RADIATION SENSING SYSTEM

BACKGROUND OF THE INVENTION

The present invention relates to a programmable optical fiber thermometer system for accurate measurement of high temperatures.

The accurate measurement of temperatures, and particularly small variations in temperature within high-temperature vessels or furnaces, has long been a desirable object. Many industrial processes require accurate knowledge of such temperatures for process control or for monitoring operations to be carried out within such high-temperature environments. For example, temperatures must be either precisely known or controlled in both jet aircraft turbine engines and within semiconductor diffusion furnaces. In the past, precise temperature control and monitoring has not been possible because the most accurate means of measuring such high temperatures has been the thermocouple. Thermocouples, however, are notoriously inaccurate and fail to provide the precision needed for accurate temperature measurement in regions of very high temperature, that is, between 500° C. and 2400° C. Moreover, such temperatures are often encountered in chemical processes or other environments where the corrosive effects of the superheated materials make the use of a thermocouple sensor impossible.

Pyrometers and other pyrometric devices such as optical light pipes have also been used in the past for measuring temperature. These instruments sense the intensity or wavelength of light generated within the region to be tested and include an output scale which converts this measurement into an equivalent temperature. Such devices are also highly inaccurate because the conversion of light intensity to temperature requires the use of certain assumptions concerning physical parameters governing the emissivity of the test region, and the light collecting and transmitting properties of the pyrometer which do not hold true for all test environments. Also, to attempt to accurately measure the wavelength of the light emitted within the region under test is very difficult due to the wide spectral distribution of light energy at any given temperature.

Another problem relating to pyrometric devices is that the dynamic range of electrical signals generated by a pyrometer can be large. In the past, logarithmic amplifiers have been used to deal with such large variations in electrical signal strength, but such logarithmic amplifiers are extremely inaccurate due to their nonlinear nature introducing electrical measurement errors which are approximations of the true linear conversion of light intensity to electrical signal.

A further shortcoming of pyrometric devices is that there are other multiple sources of error inherent in such devices to impair their accuracy. An optical pyrometer sometimes includes a detector such as a photodiode having an optical filter for filtering out certain wavelengths of light. The bandpass characteristic of the optical filter is, however, dependent upon its ambient temperature. A shift in the ambient temperature will shift the spectral response curve of the filter. Moreover, the detector itself includes a dark current output component which is independent of the flux intensity of the light impinging upon the photodetector. Lastly, the optical path forward of the detector through which the light is transmitted is never a perfect optically-transmissive path. That is, there is some insertion loss between the region where temperature is to be sensed and the detector. Any pyrometer, light pipe, or optical fiber together with associated lenses and mirrors used as an optical transmission line will attenuate the optical signal to some degree.

Some pyrometric devices have attempted to incorporate calibration systems to compensate for such light insertion losses. An example of such a calibration system is shown in Brogardh, U.S. Pat. No. 4,313,344. In Brogardh, a source of light having a known intensity is inserted into an optically-transmissive fiber where it travels to the tip of a blackbody sensor which has been inserted into a region where temperature is to be tested. The blackbody emits light as a function of the temperature and includes a reflecting layer deposited on the tip of the blackbody for reflecting light from the reference source back through the optical fiber. The light from the reference source is modulated so that it may later be separated from the light emitted by the blackbody. Calibration is performed by taking a ratio of the reference signal to the measured signal. The Brogardh system is adequate only in low-temperature environments. In high-temperature environments it is inadequate because the reflectance of the reflecting layer on the tip of the blackbody will change as it is exposed to the high temperature or as the temperature changes. Therefore, the intensity of the reflected light from the nominal light source will begin to vary as a function of temperature and time of operation, and this variance destroys its utility as a calibration signal.

Prior art pyrometric devices and thermocouples have also suffered from inaccuracies in the conversion process, that is, in converting a photodetector output signal into a temperature reading. The conversion process for thermocouples involves interpolation and calibration between fixed points that are known. The conversion for pyrometers should be performed according to the first principle of physics governing the fundamental relationship between temperature and the emission of photons of light energy. This principle is known as Planck's function, and it is nonlinear. In the past, pyrometric devices have attempted to use a linear photodetector coupled with a nonlinear scale calibrated according to certain known temperatures, or have attempted to use nonlinear amplification methods to fit a photodetector output to a linear temperature scale where nonlinear amplifiers approximated a polynominal expansion generated to fit a response curve to link points representing a set of known temperatures. Neither method provides enough accuracy in such devices for measurement of temperatures in high-temperature environments such as the aforementioned semiconductor diffusion furnaces or jet engine turbines. The solution to Planck's function must involve the calculation of a complex integral over all values of the wavelength of the light sensed by the pyrometric device. Measurement accuracy to a degree such as one-thousandth of a degree centigrade requires that this integral be mathematically calculated. Prior art pyrometric systems have not attempted to do this because the inaccuracies inherent in the actual measurement of light intensity have been subject to so many other measurement errors that these errors would have masked any accurate temperature conversion even if such a conversion had been attempted. Moreover, no such system has attempted to directly calculate the integral which defines the response of the system to the Planck function because of the complexity of the mathematics.

Prior art pyrometric systems and thermocouples have also provided little flexibility. Thermocouples have been incapable, for example, of measuring rapid fluctuations in temperature in environments where such fluctuations are common. These may be encountered, for example, in high-speed streams of superheated gases such as those encountered in a jet engine. In such instances it is important for the user to have an instrument which provides an extremely wide frequency response so that these high-speed variations can be measured. Even within the same environment it is occasionally important to know the average temperature without regard for such high-speed fluctuations in temperature. Thermocouples lack this type of frequency response. To date, there have been no pyrometric systems which can provide wide bandwidth, average, and differential temperature measurements in a single unit.

There are currently available fiber optic sensors utilizing a high-temperature optical fiber such as a sapphire rod coupled to a low-temperature optical fiber where the sensor end of the sapphire rod includes a blackbody emitter. The blackbody emitter may consist of an optically-opaque tip sputtered onto the end of the sapphire rod. The low-temperature fiber is coupled to an optical detector having a narrowband filter which provides a notch filter characteristic for the detector, focusing it upon optical wavelengths where relatively small changes in temperature yield relatively large changes in the flux intensity of the light emitted at those wavelengths. This device is described in a paper entitled "High-Temperature Optical Fiber Thermometer" by R. R. Dils, Journal of Applied Physics 54(3), March 1983.

SUMMARY OF THE INVENTION

The present invention provides a highly accurate programmable optical thermometer system controlled by a signal processor which provides a maximum degree of flexibility both in measurement methods and in calibration features. The signal processor employs an optical-temperature conversion technique which accurately converts low noise and wide bandwidth light intensity measurements to corresponding temperatures with a degree of accuracy and resolution unattainable in prior art instruments.

The system includes a sensor responsive to the temperature within a region to be tested for transmitting light energy generated as a function thereof within the region along an optically-transmissive path and detector and amplifier means responsive to the light energy for producing an output signal representative of the intensity of the light energy. A signal processor electronically calculates a display signal from the output signal representative of a temperature corresponding to the output signal according to the Planck equation. The signal processor includes a memory for storing data corresponding to a table generated from Planck's function in which predetermined ranges of the output signal correspond with predetermined temperature value increments in the table. The signal processor further includes means for calculating temperature value signals having successively finer resolution within the temperature value increments by solving Planck's function for temperatures representing successive bisections of the temperature value increments.

A principal object of this invention is to provide a method and apparatus for calculating the temperature in a blackbody radiation sensing system with extremely fine resolution.

A still further object of the invention is to provide a signal processing section responsive to a radiance signal which converts that signal to an equivalent temperature through a first principles calculation involving Planck's function and the system response functions.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 2 is a schematic diagram of a hand-held pyrometer for use with the system of FIGS. 1 and 1a.

FIGS. 3 and 3a are a schematic diagram of a portion of the detector and amplifier sections of the block diagram shown in FIGS. 1 and 1a.

DETAILED DESCRIPTION OF THE INVENTION

Figure 1:
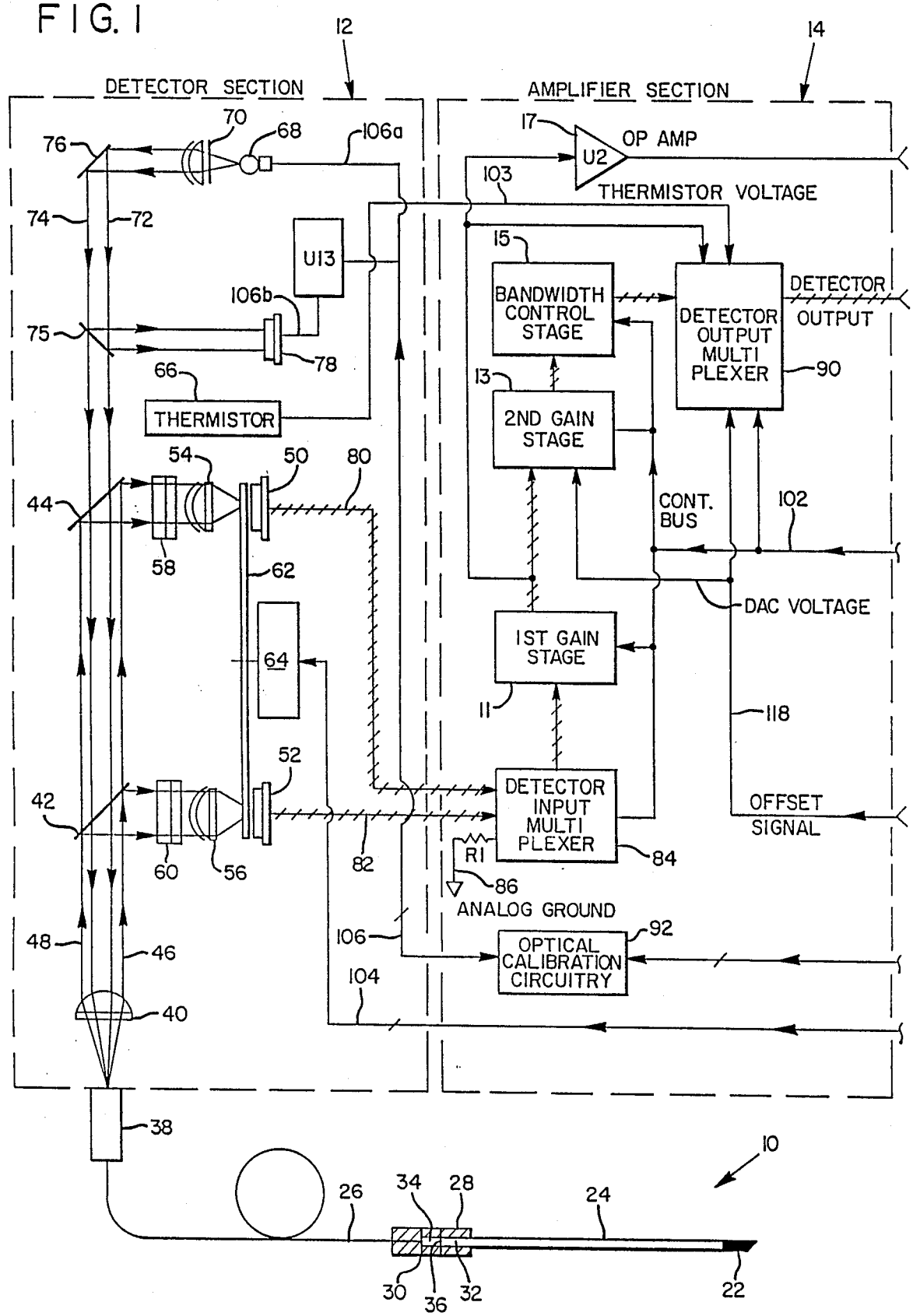
FIG. 1 is a first portion of a functional block diagram of a programmable calibrated optical fiber thermometer system comprising the present invention.
Figure 1A:
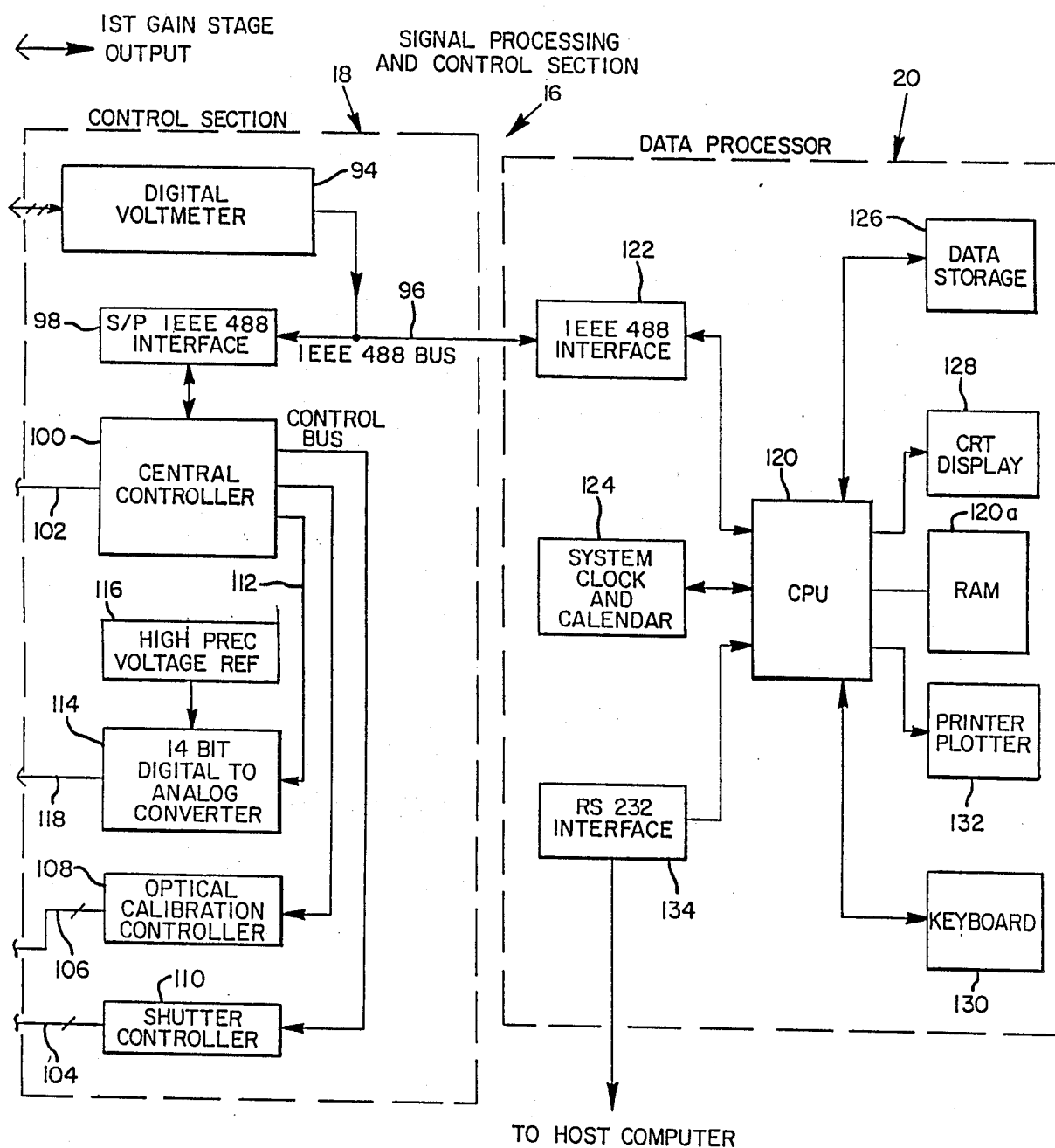
FIG. 1a is a second portion of the system block diagram of FIG. 1.

A programmable calibrated optical fiber thermometer system comprises a sensor section 10 connected to a detector section 12. The detector section 12 is in turn connected to an amplifier section 14 which is then connected to a signal processing and control section 16. The signal processing and control section 16 includes a controller 18 and a data processor 20. The data processor 20 may be any general purpose digital computer such as a microcomputer as long as the computer includes approximately 300k bytes of random access memory (RAM). The data processor 20 should also include a numeric coprocessor such as an Intel 8087 numeric coprocessor for the rapid calculation of the temperature conversion algorithm to be described herein. A suitable microcomputer for use as a data processor 20 is an IBM Personal Computer.

The sensor section 12 comprises a black body emitter 22 comprising iridium sputtered onto the end of a sapphire crystal rod 24. A sensor such as rod 24 with black body tip 22 is described in the aforementioned paper by R. R. Dils, "High-Temperature Optical Fiber Thermometer". The high temperature fiber 24 is coupled to a low temperature optical fiber 26 through a detachable optical coupler 28. The optical coupler 28 comprises a metallic sleeve which positions the input end of the low temperature fiber 30 opposite the output end of the high temperature fiber 32 across an air gap 34. Deposited on the output end 32 of the high temperature fiber is a half silvered mirror 36. The mirror 36 may be formed on the output end 32 of the high temperature fiber by sputtering or by evaporating aluminum through a mask. The particular pattern used to create the half silvered mirror 36 is unimportant, the only requirement being that 20–50% of the cross-sectional surface area of the output end 32 of the high temperature fiber 24 have a reflective coating. The air gap 34 between the high temperature fiber output end 32 and the low temperature fiber input end 30 is enclosed so that all light entering the air gap 34 from the low temperature fiber 26 is either reflected from the mirror 36 or is absorbed by the high temperature fiber 24. All light entering the air gap from the high temperature fiber 24 is transmitted into the low temperature fiber 26. The output end of the low temperature fiber 26 is inserted into an optical coupler 38. The optical coupler 38 is a positioning device which physically orients the low temperature fiber so as to project light into a lens 40 in the detector section 12. The lens 40 projects light from the low temperature fiber 26 onto the silvered portions of two mirrors 42 and 44. The light from the optical coupler, which is represented by outermost lines 46 and 48, is directed onto a pair of detectors 50 and 52 through lenses 54 and 56. Preceding the lenses 54 and 56 are a pair of optical filters 58 and 60. Filter 58 is a 600 nanometer filter and filter 60 is an 800 nanometer filter. The filters 58 and 60 are drawn schematically, it being understood that the filter itself comprises a thin film deposited on a sheet of Schott glass. A mechanically operated shutter vane 62 may be selectively employed to block light rays 48 and 46 from impinging upon the photo detectors 50 and 52. The shutter vane 62 is controlled by a motor 64.

The detector section 12 also includes portions of certain calibration features to be described herein. Positioned adjacent to the detectors 50 and 52 is a thermistor 66 which measures the ambient temperature of the detector section housing (not shown). The detector section 12 also includes a standard lamp source 68 and a lens 70 for coupling light, represented by lines 72 and 74, onto a mirror 76. The mirror 76 directs the light rays 72 and 74 onto half-silvered mirror 75 and to the non-silvered side of mirrors 44 and 42 thereby inserting light into the optical coupler 38. A detector 78 receives the light reflection from mirror 75 and develops a current which is amplified by amplifier U13. The light travels from the optical coupler 38 through the low temperature fiber 26 to optical coupler 28 where it crosses air gap 34 and is reflected by the half-silvered mirror 36. The light then travels back through the low temperature optical fiber 26 through lens 40 to mirrors 44 and 42 where it is directed onto photodetectors 50 and 52. This arrangement is used to calibrate the optical system for light insertion losses.

The detectors 50 and 52, which are preferably photodiodes, convert light impinging thereon to an electrical current which is a linear function of the light flux density. The photodiodes should be as linear as possible. The photodiode creates a current which travels across signal path lines 80 and 82 to the amplifier section 14.

The amplifier section 14 includes a detector input multiplexer 84 which has an analog ground line 86 with a large (100 Megohm) resistor R1. The detector input multiplexer 84 is connected to the input of a first gain stage 11 of amplifier section 14. The output of first gain stage 11 is, in turn, connected to a second gain stage 13 which is in turn connected to the bandwidth control stage amplifier 15. An operational amplifier 17 is connected to the output of first gain stage 11 to provide a wideband output independent of any signal processing past the first gain stage 11. The output of the bandwidth control amplifier 15 is connected to the input of detector output multiplexer 90. The detector output multiplexer 90 also includes inputs from thermistor 66 and from the output of the first gain stage amplifier 11. The amplifier section 14 also includes an optical calibration circuit 92 which is connected to standard lamp source 68. The output of detector output multiplexer 90 is a voltage output which is connected to the controller section 18 of signal processing and control section 16.

The multiplexer voltage output feeds directly into a digital volt meter (DVM) 94 which may be any conventional DVM, for example a Hewlett-Packard Model 3478A. The output of the DVM 94 is connected to a standard IEEE 488 bus 96. The bus 96 is connected through an interface 98 to a central controller 100. The central controller 100 decodes logical signals from the data processor section 20 and provides voltages which control various switching functions in amplifier section 14 and in detector section 12. The circuitry required to decode coded digital logic signals and to provide voltages for the control of relays, logic circuit gates and motors may be of any conventional design. The output of central controller 100 comprises a primary control bus 102, and secondary control buses 104 and 106. Control bus 102 is connected to the detector input multiplexer 84 and to amplifiers 11, 13 and 15. Control buses 106 and 104 govern the operation of optical calibration controller 108 and shutter controller 110, respectively. The central controller 100 also includes a digital output line 112 which forms the input to a 14 bit digital-to-analog converter (DAC) 114. The digital-to-analog converter 114 is driven by a high precision reference voltage source 116. The output of DAC 114 is a DAC voltage line 118 which provides an offset signal to the second gain stage amplifier 13. This offset voltage is mixed in second gain stage 13 with the output of amplifier 11 and is also provided to the detector output multiplexer 90.

The data processor 20 of the signal processing and control section 16 comprises a general purpose digital computer and associated peripherals. An example of such a computer is an IBM Personal Computer having 256k bytes of RAM. The computer comprises a central processing unit (CPU) 120 and RAM 120a. The CPU 120 is connected to an IEEE 488 interface 122 which is connected to corresponding interface 98 in the control section 18 by IEEE bus 96. The data processor 20 also includes a system clock and calendar 124, a hard storage memory unit 126, such as a floppy disk storage unit, a CRT display 128 and a keyboard 130. To display data in hard copy, a printer or XY plotter 132 may be added to the system. The computer may also be driven as a slave unit from a host computer through an RS232 interface port 134.

The system of FIG. 1 measures temperature by relying on the first fundamental principle of physics defining the relationship between temperature and the flux density of light emitted by an object at a given temperature. This principle is known as Planck's equation and it rigorously defines the relationship between any object at a given temperature and the flux density of light emitted by that object. The form of Planck's equation used in the system of FIG. 1 is the following:

$$L = \frac{K\epsilon_1 C_1}{\lambda^5 \left[ \exp\left(\frac{C_2}{\lambda T}\right) - 1 \right]}$$

Where,
L = radiance in W/m
$\lambda$ = wave length

K = a physical constant relating to the shape, light transmitting properties and dimensions of the sensor $\epsilon_1$ = the apparent emittance $C_1$ = the first radiation constant, $0.59544 \times 10^{-16}$ W·m$^2$ $C_2$ = the second radiation constant, $1.438786 \times 10^{-2}$ mK T = temperature in °K The black body emitter 22 in sensor section 10 has an emittance $\epsilon(T)$ a known function of temperature. It emits light whose intensity varies as a function of the temperature within the region to be tested. This light is transmitted through optical fiber 24 and low temperature optical fiber 26 to optical coupler 38, thence through lens 40 into the detector section 12 and ultimately to detectors 50 and 52. Since the output of detectors 50 and 52 is a known function of the light intensity emitted by black body emitter 22, the output of detectors 50 and 52, which is a photodiode current, may be processed as if it were a direct radiance measurement. This feature enables a user to select any one of a multiplicity of sensing devices that either emits or collects light energy from the desired object or region to be tested. Thus, in place of high temperature fiber 24 and black body emitter 22, a high temperature optical light pipe may be connected to the optical coupler 28 if desired. In such a configuration the output end of the light pipe (which would correspond to output end 32 of high temperature fiber 24) would have a half silvered mirror deposited thereon. Such an optical light pipe would include at its input end an optically polished surface for collecting light from a region of high temperature. Such a region could include, for example, a semiconductor diffusion furnace where it is necessary to measure the temperature of silicon wafers undergoing a diffusion process. An optical light pipe is suitable for this application because the emissivity of silicon is a known physical quantity. Similarly, gallium arsenide, another common semiconductor material, has a known emissivity which can be inserted into the equation representing Planck's function, and the temperature of the material may be calculated therefrom.

Figure 2:
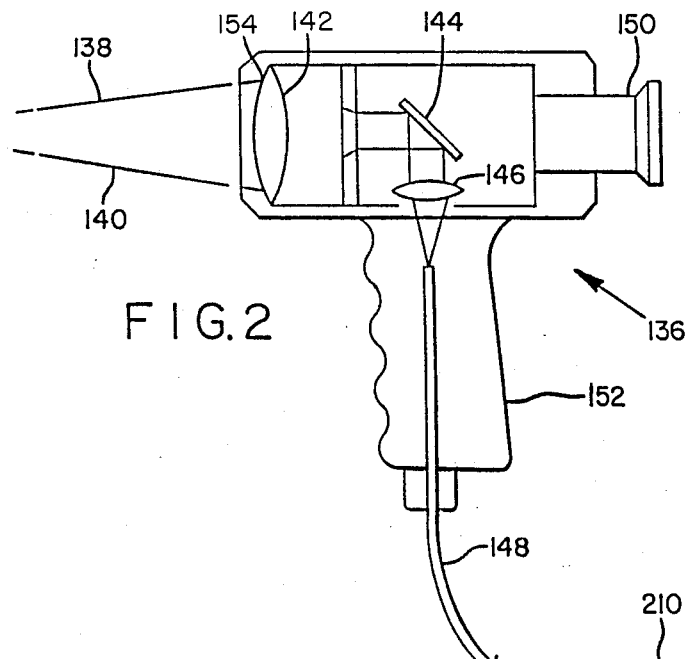

In addition to an optical light pipe, a pyrometer may be used as a light gathering input to the detector section 12. Such as device is shown in FIG. 2 which includes a pyrometer 136. The pyrometer 136 collects light represented by lines 138 and 140 by focusing it through a lens system 142 onto a mirror 144. The mirror reflects the light into a second lens system 146 which focuses the light into a low-temperature fiber 148 which provides an optically transmissive path to guide the light into the detector section 12. The pyrometer may include an eyepiece 150 and may be portable and hand-held, as such including a pistol-type grip 152. The lens 142 includes a half-silvered coating 154 deposited on the front of the lens for reflecting light from the standard lamp source 68 for calibration purposes as will be explained below.

Reference is now made to the schematic diagram in FIGS. 3 and 3a. The two detectors 50 and 52 include photodiodes D1 and D2. Photodiode D1 is preceded by 800 nanometer optical filter 60 and photodiode D2 is preceded by 600 nanometer optical filter 58. Either photodiode may be selected for use, and appropriate switching is provided by relays K1 and K2. The combined output of D1 and D2 forms the input to operational amplifier U1 which is part of the first gain stage 11 of the linear amplifier section 14. The input to U1 may be grounded through K3 which includes in the ground circuit a 100 Megohm resistor R1. K1, K2 and K3, collectively comprise input multiplexer 84. This circuit enables readings to be made of the quiescent electronic signal current which may be stored in data processor 20 for use as a voltage offset calibration factor. This provides electronic calibration for the actual current readings taken from the outputs of D1 and D2.

The linear operational amplifier U1 includes a plurality of selectively connectable shunt paths between its input and output operated by relays K4 through K7. Each shunt path includes a resistor, so that selection of the appropriate shunt path by one of the relays K4 through K7 selectively increases or decreases the gain of the amplifier U1. Relays K4, K5, K6 and K7 are connected to central controller 100 by bus 102b. Mechanical relays are recommended for use with this first stage 11 of the linear amplifier section 14 because mechanical relays experience no current drain when they are opened. Since the current input to U1 may be as small as $10^{-14}$ amps, even very small quiescent current drains may distort the signal appreciably.

The thermistor 66 comprises a temperature-sensitive resistive element RT1 coupled through a junction J101 to detector output multiplexer 90.

The shutter 62 is operated by motor 64 which depends in turn upon the operation of two solenoids SOL1 and SOL2, respectively. SOL1 opens the shutter and SOL2 closes the shutter. SOL1 is coupled to shutter controller 110 by line 104a via bus 104 from shutter controller 108 and SOL2 is connected to controller 110 by line 104b, from bus 104.

The standard light source 68 includes a lamp LP1 connected through a junction J104 to line 106b which is in turn connected to optical calibration circuit 92. The detector 78 includes a photodiode D3 connected to an amplifier circuit comprising operational amplifier U13, capacitor C14, variable resistor VR4 and resistor R4. U13 is a linear amplifier and produces a voltage output for the current input from D3. It is connected to optical calibration circuit 92 via a control line 106a.

The output of U1 divides into two branches. Branch 136 is a signal path which is connected to the input of the second gain stage 13 of the linear amplifier section and comprises an operational amplifier U3 (refer to FIG. 3a). A second output branch, line 138, is connected to the positive terminal input of operational amplifier U2 which includes feedback resistor R3, output resistor R18 and potentiometer VR2. The output of U2 is connected through a solid-state switch U10B to a first stage output jack BNC-3. This jack may be located, for example, on the rear panel of a housing (not shown) combining both the detector section 12 and the amplifier section 14. The purpose of providing such an output at the rear panel of the housing is to enable the user to extract a preamplified very wideband signal which can be used independently of the downstream signal processing in the amplifier section 14 and the signal-processing and control section 16. Such an output might be useful, for example, in measurement standards work such as that conducted by the National Bureau of Standards where a wideband unfiltered signal representing raw temperature data is needed.

The signal path 136 is connected through solid-state switch U5A to input pin 2 of operational amplifier U3 which comprises a portion of the second linear amplifier gain stage 13. The switch U5A is a two-position switch which alternately provides direct coupling for line 136 to the input of U3 or coupling through capacitor C2 to the input of U3. Alternating current coupling which is provided through C2 provides the system with wide bandwidth capability for measuring very rapid fluctuations in temperature. Pin 2 of U3 also includes a second input through R5A and switch U5B from an offset input jack BNC2. This jack couples DAC voltage line 118 into the input of U3. The gain of amplifier U3 is controlled by selectively connecting one of a plurality of shunt paths containing resistors R8A, R8B, R8C, R8D and R8E between the output and input of U3 through the use of solid-state switches U7A, U7B, U8A and U8B. Solid-state switches may be used in connection with the second gain stage because the input is a voltage, not a current in the microamp region, and is less affected by quiescent currents.

The output of U3 is connected to the input of U4, an operational amplifier for the bandwidth control stage 15 of the amplifier section 14. The bandwidth of the system is selectively controlled by connecting one of a plurality of shunt paths between the input and output of U4, each of the paths containing one of the capacitors C5, C6 or C7. The shunt paths are selectively connected between the input and output of U4 through solid-state switches U9B, U9C and U9D. The output of amplifier U4 is connected to detector output jack BNC-1 through solid-state switch U10C.

Switches U10A, U10B, U10C and U10D, and their associated control lines, comprise the detector output multiplexer 90. Switches U5A, U5B, U7A, U7B, U8A, U8B, U9B, U9C and U9D are all connected to control bus 102 via bus 102d for U7A, U7B, U8A, U8B and via bus 102c for U9B, U9C and U9D and are controlled by signal voltages from central controller 100. These voltages are produced by a decoding and switching network which receives coded signals from CPU 120 over bus 96 through interface 98 that enable various ones of the aforementioned relays and/or switches to open or close. Thus, the detector input configuration, the use of various calibration features, and the configuration of the amplifier section 14, may all be controlled through central controller 100, which is in turn controlled by data processor 20. The control options relate to gain control, bandwidth control, detector input and choice of calibration feature.

Gain and Bandwidth Control

Gain control may be effected either automatically or by the choice of an appropriate gain factor. In the automatic mode, the gain is controlled so that input currents which range from $10^{-14}$ to $10^{-3}$ amps produce output voltages ranging from $10^{-2}$ to 10 volts. The detector output voltages are provided through the multiplexer 84 to the IEEE bus 96 where they are sent to the CPU 120 and compared to present limits. If the input current is below a preset limit, the CPU 120 sends appropriate commands to the amplifier section 14 through controller 100 and control bus 102 to selectively operate the appropriate relays in the first and second gain stages to increase the amount of gain. Alternatively, if the input current is above a second preset threshold current, the CPU 120 sends a second set of commands through controller 100 over control bus 102 to decrease the gain in first and second gain stages of amplifier section 14. In this way the voltages within the amplifier are compressed between a pair of preset limits regardless of the actual detector output current. Thus the detector output voltage at jack BNC-1 will always range between a pair of predetermined limits whose dynamic range is several orders of magnitude less than the dynamic range of the input current. This does not affect the linearity of the amplification by amplifier section 14, however, because the gain factor is stored in the CPU 120 when the gain instructions are sent to the central controller 100. As will be explained below, when a calculation is made converting the detector output voltage into an actual temperature reading, this gain factor is removed. This reconverts the compressed output detector voltage to its original dynamic range which can then be utilized by the data processing section 20 to calculate the actual temperature.

The bandwidth of the system is controlled through the bandwidth control stage 15 which includes operational amplifier U4 and associated shunt capacitors C5, C6 and C7. Through appropriate commands entered from keyboard 130 and directed to switches U9B, U9C and U9D from controller 100, the response of the system can be rolled off from a very wide bandwidth, as high as 50 KHz, to DC. The capacitors C5, C6 and C7 are, in effect, low-pass filters which roll off the natural wideband frequency response of the system.

Mode Control

The present invention provides maximum flexibility in the number of ways in which temperatures can be determined. Since there are two detectors, each having a different filter, temperature readings may be acquired by either and combined in a variety of ways. For example, by suitably instructing the detector input multiplexer 84, readings may be alternately chosen from either detector 50 or detector 52. These readings may be stored in memory and displayed in side-by-side relationship or, if desired, a ratio of light measurements made with the 600 nanometer filter 58 and with the 800 nanometer filter 60 may be made. The system may be programmed to select the most sensitive filter and hence the appropriate detector, either 50 or 52, for the particular temperature range of interest. Light wavelengths generated in the 600 nanometer region provide the most accurate indications of temperature for temperatures above 1240° C. For temperatures below 1160° C. the detector 52 in the 800 nanometer filter path is more appropriate. For temperatures between 1240° C. and 1160° C. either filter is appropriate.

Figure 5:
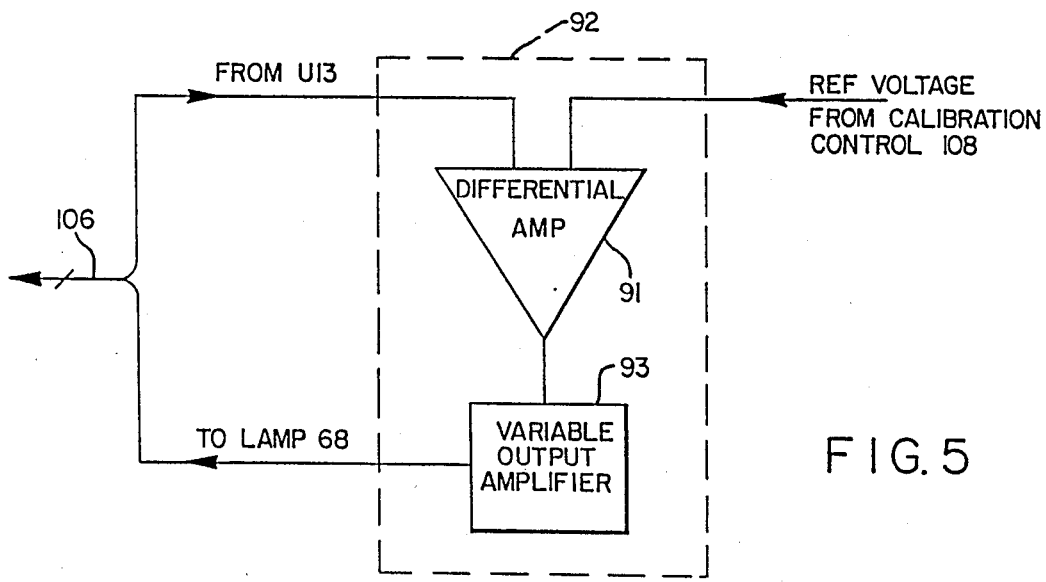
FIG. 5 is a block schematic diagram of optical calibration circuitry 92.

The system also provides means for making differential temperature measurements. The differential temperature measurement mode allows the user to factor out the average temperature, and instead obtain very high resolution of small fluctuations in temperature about an average. This will be extremely useful in differential thermal analysis research applications in which small temperature variations about a known average temperature of a material can be related to phase transformation within the material. In the differential temperature measurement mode, the CPU 120 provides the central controller 100 with a signal that opens switch U5A between pins 3 and 4, closes the contact between pins 16 and 1, and closes switch U5B (refer to FIG. 5). This provides DC coupling between the first and second gain stages 11 and 13 within the amplifier section 14. The CPU 120 also calculates the average temperature and provides a signal representing this temperature (with the gain appropriately scaled) as a digital signal to the central controller 100. This digital signal is supplied by the central controller 100 over line 112 to 14-bit DAC 114. The DAC 114 converts the digital signal through the use of a high-precision voltage reference source 116 to an analog voltage where it is supplied over line 118 to the input pin 2 of U3 through resistor R5A through closed switch U5B. The polarity of the DAC voltage is opposite the polarity of the output of the first gain stage 11 and the two voltages subtract algebraically at the input to U3. Thus, the only input component left for amplifier U3 is the difference component representing a small temperature variation from the average temperature.

In the wideband mode, U5A closes the contact between pins 3 and 4 and opens the contact between pins 16 and 1 thereby coupling the output of U1 to the input of U3 through C2. C2 blocks any DC component of the output of U1 and enables further amplification of very rapid temperature fluctuations about the average temperature. In this mode, the first stage signal is connected to the digital voltmeter 94 through the output multiplexer 90. The CPU 120 computes the average temperature from this signal and from the ratio between the wide bandwidth variation in detector output voltage at pin 10 of U10C and the variation in temperature about the average temperature.

The AC fluctuations about the average voltage undergo further amplification in U3 thereby increasing dynamic range of the instrument. In this manner, very small fluctuations about the average temperature can be measured. These measurements are of interest in the description of the gas dynamics of carburetor exhaust gases from an aircraft gas turbine main burner. In this mode, the wide bandwidth signal is applied directly to external wide bandwidth equipment such as a tape recorder, digitizer, or fast fourier transform spectrum analyzer.

In the wide bandwidth mode a sensitivity factor which depends upon average temperature is calculated to provide calibration for the display of temperature fluctuations about an average. The sensitivity is equal to $(\partial L)/\partial T$ where $L=f(\lambda,T)$, i.e. Planck's function. This partial derivative is $(LC_2)/\lambda T^2$ and for values of T covered by the system, it is approximately equal to a ratio of 20 to 1. The true ratio which may be 20.01 or 19.98 is continuously calculated, however, to provide a precise scale factor during this mode. $\lambda$ is assumed to be either 800 or 600 nanometers depending upon the detector selected.

Temperature Calculation for Single Wavelength

As an example of the temperature calculation algorithm the temperature calculation for a single wavelength mode of operation is described. The output of digital volt meter 94 is a voltage which represents photodiode current converted to a voltage having appropriate gain. This voltage is converted to a temperature reading through the use of an algorithm contained in the data processor 20 which calculates the temperature from first principles using Planck's function and independently measured parameters. The data processor 20 uses a combined binary search and tabular look-up algorithm to convert the measured voltages to temperatures. The physical constants which define the efficiency of the sensor section, the detector optics and the electronics, are either prerecorded and placed in memory, or are periodically measured and stored in memory. These constants may be periodically updated through the use of the calibration features described below.

The random-access memory portion 120a of central-processing unit 120 contains two tables relating to the photodiode current which appears at the input to the detector input multiplexer 84. This photodiode current is produced by whatever sensing device is chosen, and the physical constants in Planck's equation relating to the specific device are inserted into the algorithm. For example the emissivity of a blackbody radiator such as blackbody 22 is nearly always equal to one, whereas the emissivity of silicon or gallium arsenide may vary with temperature. If a light pipe is to be used to measure the temperature of the latter two materials, this emissivity function is simply recorded in memory for insertion into the temperature conversion algorithm. Therefore, the choice of which constants to use simply depends upon which values are selected from memory, which in turn depends upon the nature of the sensor. Other physical constants which relate specifically to the light-collecting capabilities and efficiency of the various sensors that could be employed are treated in the same way.

The CPU 120 stores two tables, one for the 600 nanometer filter 58 and one for the 800 nanometer filter 60. The following discussion relates only to the calculation of temperature from the 600 nanometer channel, it being understood that the calculation is identical for the 800 nanometer channel using a different set of constants.

For the 600 nanometer channel, a table is stored in the RAM 120a where for each reading of photodiode current $I_{PDC}$ produced at the output of the detector, temperature $T=773.16+N(2.92968)°K.$, where $N=0,1,\ldots, 511$. The photodiode currents corresponding to these temperature values are derived by calculation from Planck's function and the independently measured parameters. They span the temperature range of 773° Kelvin to 2270° Kelvin. To make a temperature reading the data-processing section 20 converts the voltage reading from digital voltmeter 94 to the equivalent photodiode current by factoring out the gain produced in amplifier section 14, the direct current offset produced by the amplifier section electronics, and the photodiode dark current. The equivalent photodiode current I6 is used to search in the appropriate table to find the temperature interval within which the present temperature reading must lie. This is possible because photodiode current increases monotonically over the temperature range of interest for both the 600 nanometer and 800 nanometer optical paths. The table search finds the upper and lower bounds of a temperature range which contains the temperature corresponding to the photodiode current. The upper and lower bounds are denoted as Tu and Tl, respectively. Since Tu−Tl=2.92968° K. within a 1500° K. temperature range, the table search provides 9 bits, or one part in 512 resolution of the actual temperature.

Next, the CPU 120 performs a binary hunt in the temperature range bounded by Tu and Tl to find the temperature corresponding to the actual photodiode current. The resolution available for this temperature reading may be selected by the user. Twenty-one bits of resolution, for example, would calculate this temperature to within 0.001° K.

The binary hunt is performed by successively bisecting the temperature range bounded by Tu and Tl; calculating from Planck's function, using appropriate calibration factors, the photodiode current that would be produced by a sensing device collecting optical radiation at a temperature which is the center of the bisection; comparing the calculated photodiode current with the actual measured photodiode current; logically selecting that half of the temperature range bounded by Tu and Tl within which the actual photodiode current must lie;

and, performing a successive bisection of the equivalent temperature within that bisected interval. Each successive bisection provides a bit of resolution to the measured temperature. The initial table search provides nine bits of resolution and an additional twelve bits of resolution provided by twelve successive bisections of the temperature interval would provide, in all, twenty-one bits of resolution.

In performing successive bisections of the temperature interval between Tu and Tl it is necessary on each occasion to convert a temperature which lies at the center of a bisected interval to its equivalent photodiode current using the Planck function. The Planck function relates to the amount of light flux emitted by a blackbody or transmitted through a pyrometer or optical light pipe and is equal to:

$$L = \frac{K\epsilon_1 C_1}{\lambda^5 \exp\left(\frac{C_2}{\lambda T}\right) - 1}$$

The photodiode current $I_{PDC6}$ which is a function of the wavelength, the temperature and the detector temperature is the integral over those wavelengths of light reaching the photodiode times the absolute responsivity of the photodiode plus the dark current, that is:

$IPDC6(\lambda,T,T_D) = \int_\lambda L(\lambda,T,T_D) R_6(\lambda,T_D) d\lambda + \text{Dark } 6(T_D)$ The voltage measured by digital volt meter 94 is equal to:

Vmeas = IPDC6($\lambda$,T,D) GAIN (i) + OFFSET (i).

Solving for the photodiode current yields:

$$IPDC6 = \frac{Vmeas - \text{OFFSET}(i)}{\text{GAIN}(i)} \quad (1)$$

The photodiode current, due to the light striking the detector, is $I_{PDL6}(\lambda,T,T_D) = \int_\lambda L(\lambda,T,T_D) R_6(\lambda,T_D) d\lambda \quad (2)$ then $$I_{PDL6}(\lambda,T,T_D) = \frac{Vmeas - \text{OFFSET}(i)}{\text{GAIN}(i)} - \text{DARK}_6(T_D) \quad (3)$$

Equation three describes how the data processing unit 20 derives a value for the photodiode current due to light radiating from sensing unit 10, that is, Vmeas is the measured output of digital volt meter 94, OFFSET (i) and GAIN (i) are determined, respectively, through an electronic diagnostic calibration mode, and GAIN is a factor stored in memory and periodically updated as the gain changes in response to the photodiode current output. The dark current of each photodiode is measured during the dark current calibration mode.

The signal processor calculates a temperature using equations 2 and 3 in the following manner.

(1) As a result of calibration measurements adjusting the spectral wavelength response of the detector filter 58 (the same is true for filter 60), a table is generated such that current $(I_6(n)) = IPDL6 (\lambda,T,298° K.) d\lambda$ where T=773.16° K.+n ((1500)/512) °K., n=0,1, ... 511 and 298° K. is the nominal temperature of the detector section 12.

(2) Temperature readings acquired by the DVM 94 are converted to photodiode current IPDL6(meas) using equation 3.

(3) The table described in Step 1 is searched such that $I_6(j) \leq IPDL6(\text{meas}) < I_6(j+1)$ j=0,1,2, ... 510.

(4) Upper and lower temperatures, Tu and Tl, corresponding to $I_6(j)$ and $I_6(j+1)$ are now known because $I_6(j)$ increases montonically $T1 = 773 + j(1500)/512 \quad Tu = 773 + (j+1)(1500)/512$ (5) The temperature range Tu−Tl is bisected to find Tmid, i.e.

Tmid = (Tu+Tl)/2

(6) Next the integral $I_6(\lambda,Tmid,T_D) = \int L(\lambda,Tmid,T_D) R_6(\lambda,T_D) d\lambda$ is calculated, where $T_D$ is the actual temperature of the detector as determined by thermistor 66.

(7) $I_{PDL6}$ is compared with $I_{6Tmid}$ above to determine which is larger. If, for example, $I_{6Tmid} > I_{PDL6}$ then the actual temperature Tmeas lies somewhere between Tl and $T_{mid}$. If $I_{PDL6} > I_{6Tmid}$, then $T_{mid} < T_{meas} < Tu$.

(8) Step (5) is repeated using the appropriate bisected interval-($T_{mid}$−Tu) or $T_{mid}$−Tl.

(9) Step (6) is repeated, substituting $(T_{mid}+Tu)/2$ or $(T_{mid}+Tl)/2$ in place of $T_{mid}$ in the integral calculation.

(10) The calculated integral for $I_6$ is again compared with $I_{PDL6}$ and Step (7) is repeated.

These steps repeat for n bits of resolution or until $I_{PDL6}$ matches $I_6$ (calculated) for the number of significant digits chosen. At this point T equals the temperature within the region to be tested in the integral.

The temperature calculation described above depends upon evaluation of the integral in equation 2. The expanded integral of equation 2 includes the following terms for sensor section 10:

$$IPDL(\lambda,T,T_D) = \int_\lambda \frac{Aexit\, Em(T) C_1}{\lambda^5 \exp\left(\frac{C_2}{\lambda T}\right) - 1} \cdot$$

$AB(T) \cdot AOC^2 \cdot ALTOF(\lambda) \cdot ANF6(T_D) \cdot AFIL6(\lambda,T_D) \cdot$ $AHSM1 \cdot AOL6 \cdot R_6(\lambda,T_D) d\lambda$ where:
1. Aexit: Exit area of the blackbody emitter 22.
2. AB(t): Transmittance of the sapphire rod 24 as a function of sensor temperature T.
3. EM(T): Apparent emissivity of the blackbody emitter 22 as a function sensor of temperature T.
4. AOC: Transmittance of the low temperature optical fiber couplers 28 and 38.
5. ALTOF: Transmittance of the low temperature optical fiber 26 as a function of light wavelength.
6. AHSM1: Transmittance of the first half-silvered mirror 36.
7. AHSMC: Transmittance of the beam-splitting mirrors 42 and 44.
8. ANF6(D): Transmittance of a neutral filter in the 600 nM optical path as a function of detector temperature $T_D$.
9. ANF8(D): Transmittance of a neutral filter in the 800 nM optical path as a function of detector temperature $T_D$.
10. Afil6($\lambda,T_D$): Transmittance of the 600 nM filter 58 as a function of the light wavelength $\lambda$ and detector temperature $T_D$.

11. Afil8($\lambda$,$T_D$): Transmittance of the 800 nM filter 60 as a function of light wavelength $\lambda$ and detector temperature $T_D$.

12. $R_6(\lambda,T_D)$: Absolute responsivity of the photodiode in the 600 nM optical path as a function of the light wavelength $\lambda$ and detector temperature $T_D$.

13. $R8(\lambda,T_D)$: Absolute responsivity of the photodiode in 800 nM optical path as a function light wavelength $\lambda$ and detector temperature $T_D$.

14. DARK8($T_D$): Dark current of the photodiode in the 800 nM optical path as a function of the detector temperature $T_D$.

15. AOl6: Optical transmittance in the 600 nM optical path.

16. AOl8: Optical transmittance in the 800 nM optical path.

These terms are physical constants which are either known or measured and stored in memory. Some are periodically updated through calibration measurements which will be described below. Those terms that do not depend upon $T_D$ are removed from the integrand. For example, all quantities dependant upon detector temperature $T_D$, a measured quantity, and physical parameters relating to dimensions of components in the optical path may be moved outside the integral.

Next, integration is performed for appropriate limits of $\lambda$ using Simpson's Rule. An example of this technique may be found in Ford, *Differential Equations*, (McGraw-Hill, 1955). The appropriate limits of $\lambda$ are for the 600 nM filter 58, $500 \leq \lambda \leq 700$ nM and for the 800 nM optical filter 60, $700 \leq \lambda \leq 900$ nM. An arithmetic coprocessor such as an Intel 8087 may be used to perform the numeric integration described above. Using such a coprocessor the above-described algorithm may be executed in 200 msec. Accuracy within 0.0025% and 21 bits of resolution are provided by the system, the calculation of the temperature algorithm and the use of calibration factors to be described below.

Calibration Modes

The present invention provides four different calibration modes which correct for potential errors introduced into the system. Calibration is accomplished by measuring the sources of error and including these sources of error as factors in the calculation of the actual temperature according to the temperature calculation algorithm described above. The system software may include provision for suitable commands through the CPU 120 as entered by keyboard 130 to command the system to execute a particular calibration mode. This will reconfigure the system to make the appropriate measurements and store the data in an appropriate memory location for use by the temperature calculation algorithm.

The dark current calibration mode measures the current output of detectors 50 and 52 when no light is present. This calibration is accomplished by a computer instruction which instructs central controller 100 to actuate shutter controller 110, which in turn provides a signal to motor 64 via bus 104 to close shutter 62. This is accomplished by actuating solenoid SOL2 through junction 103. With the shutter closed a reading is taken of both detectors 50 and 52 which is converted to an equivalent current by CPU 120 and stored in memory as the dark current factor, for example, as DARK 6 in equation (2) above.

A command to execute the electronic calibration mode causes the detector input multiplexer to open relays K1 and K2 and to close relay K3. In this configuration, the input to U1 is grounded through R1, a 100 megohm resistor, and offset voltage in the amplifier section 14 may be measured and stored in memory. This factor is provided in the temperature calculation algorithm as an algebraic offset to the actual photodiode current, OFFSET(i) in the algorithm above. This mode also measures nominal GAIN(i).

A third calibration mode calibrates the system for shifts in the spectral wavelength response of the photodiodes D1 and D2, and filters 58 and 60 as a function of temperature, $T_D$. The optical system including lens 40, mirrors 42 and 44, detectors 58 and 60, lenses 54 and 56 and the detectors 50 and 52 are housed within a solid metal housing (not shown). The temperature of this housing, and hence that of the detector filters 58 and 60 and photodiodes D1 and D2, varies with the ambient temperature. This ambient temperature which is measured by thermistor 66 through RT1, is a direct temperature reading which is stored in CPU 120 and is used to modify the response curve of each detector filter as a function of temperature. In the temperature calculation algorithm, the transmittance of the 600 and 800 nanometer filters, and the absolute responsivity of photodiodes D1 and D2 are all a function of the detector section ambient temperature, $T_D$. These functions collectively have a bell-shaped curve of light flux density versus temperature centered on the nominal wavelengths of the filters 58 and 60. This curve shifts along the temperature abscissa as $T_D$ changes, thus creating a new curve which may be represented as a new table of wavelength values.

The optical path is also calibrated for light insertion losses. This is accomplished through the use of a fiber calibration mode which injects a light source of known intensity into the low temperature optical fiber 26, and measurements representing the transmittance of the optical fiber and other components in the optical path are made and stored in memory. All factors in the optical path that are represented by constants in the temperature calculation algorithm may be altered by an error correction factor correcting for inefficiencies in the transmittance of the optical system.

Fiber Calibration Mode

In order to perform the calculation described above, it is necessary to measure the loss of light energy along the optical path. Since the optical path does not provide a perfect transmission line for the light energy and the optical signal is therefore attenuated to some degree, the system must therefore be calibrated to provide this degree of attenuation as a factor in performing the temperature calculations. The calibration is performed by inserting light energy from a light source of known intensity into the system measuring the amount of light transmitted through the system from the standard light source and comparing the measured amount of light with the known intensity of the standard light source.

Figure 4:
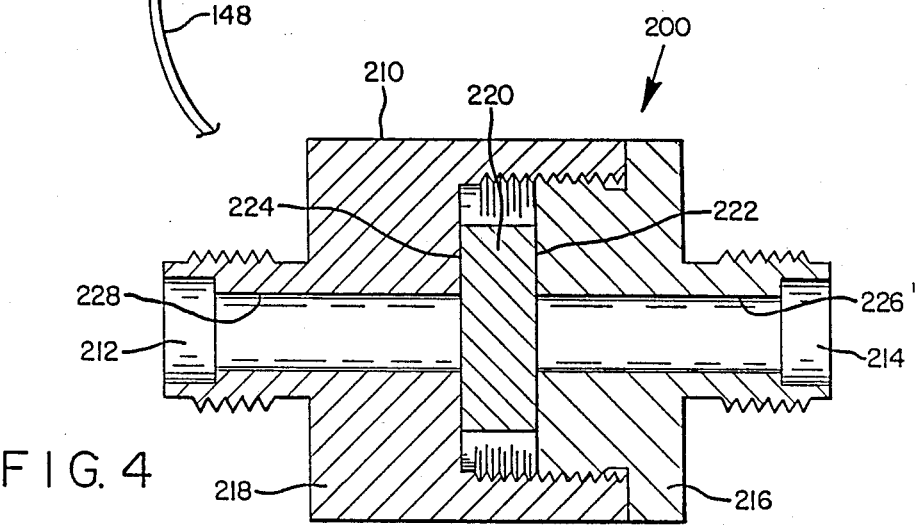
FIG. 4 is a cutaway view of a mirror assembly used in connection with an optical calibration mode.

One way of calibrating the system is to divide the optical path into sections and to measure the light intensity from the standard lamp source 68 with various sections of the optically-transmissive path removed from the system. In order to accomplish this function, a detachable mirror assembly 200 is provided (refer to FIG. 4). The mirror assembly of FIG. 4 comprises a cylindrical coupling 210 which includes a dark input end 212 and a reflecting input end 214. The mirror assembly may be constructed of two modular pieces 216 and 218 which are screwed together. The purpose of making part 216 detachable from part 218 is to enable a user to clean the surface 222 of the mirror 220. A mirror 220 includes a silvered side 222 and a dark side 224. A channel 226 leads from the end 214 onto the silvered side 222 of mirror 220. A corresponding channel 228 leads to the dark side 224.

In order to calibrate the system using mirror assembly 200 three radiance measurements are taken. First, the dark end 212 of the mirror assembly 200 is coupled to the detector section 12 through low temperature fiber 26 and optical coupler 28. The standard light source 68 is then actuated and a measurement of light intensity is taken. The light intensity measurement taken during this procedure will consist mainly of light scattered by mirrors 44 and 42, there being no reflectance due to the fact that the dark side 224 of mirror 220 absorbs most of the light from light source 68.

Next the mirror assembly is reversed and input end 214 is coupled to detector section 12 through optical coupler 38. The standard lamp source is again actuated and a radiance measurement is taken. This time, since the silvered end 222 of mirror 220 is coupled into the system, the radiance depends upon the attentuation of the lens assembly 40 and the reflectance of the mirrors 76, 75, 44 and 42, as well as attenuation through filters 58 and 60 and lenses 54 and 56.

Finally, the high-temperature fiber 24 (which could also comprise a light pipe or other high-temperature element) is again uncoupled from optical coupler 28 and mirror assembly 200 is coupled to the input end 30 of low-temperature fiber 26 in its place. The mirror assembly 200 is coupled so that the silvered end 222 is disposed opposite the end 30 across air gap 34 so that light transmitted through low-temperature fiber 26 will reflect off of surface 222 and travel back through optical fiber 26. The light source 68 is again actuated 20 and a third radiance measurement is taken which will take into account attenuation through low-temperature fiber 26.

The mirror assembly 200 is adapted to be detachably coupled to optical coupler 28 and as such may provide for a threaded insertion into a recess provided in optical coupler 28 in place of high-temperature fiber 24. The mechanical details of this connection are not shown, it being understood that any detachable coupling between high-temperature fiber 24 and optical coupler 28 compatible with a similar detachable coupling on mirror assembly 200, is acceptable. The coupling should provide colinear disposition of fibers 24 and 26 across air gap 34 as well as providing for orthoganal disposition of mirror 220 across air gap 34 opposite the end 30 of low-temperature fiber 26.

Having taken these radiance measurements, the data processor 20 computes the light insertion loss. The calibration factor is computed by data processor 20 as follows:

$$\text{Optical insertion loss} = \left(\frac{I_{FM}}{I_M} \cdot \frac{I_{FSC}}{I_{SC}}\right)^{-1} \left(\frac{I_{FR} - I_{FSC}}{I_R - I_{SC}}\right)$$

where $I_{SC}$=factory measured light intensity with dark end 224 of mirror 220 connected to optical coupler 28

$I_M$=factory measured light intensity with silvered end 222 of mirror 220 connected to optical coupler 38

$I_R$=factory measured light intensity with silvered end 222 of mirror 220 connected to optical coupler 28.

Initial calibration of the system utilizes the formula above omitting the values of $I_{FSC}$, $I_{FR}$, and $I_{FM}$, thus defining the optical insertion loss as $I_M I_{SC}/I_R \cdot I_{SC}$. This value is then stored in memory in data processor 20 and is available for use as a calibration factor which may be multiplied by those terms in the Planck integral which include a term relating to light energy attenuation. The subscript F preceding the radiance measurements above indicates that the measurements are made in the field after factory calibration. Each time the calibration is performed, the attenuation factor is recalculated using the new measurements so that memory may be periodically updated if the system configuration changes. In actual practice the only changes to the system should come from components upstream of optical coupler 38, since the other detector section components are contained within an integral housing and are not likely to be disturbed.

Use of the fiber calibration mode when temperatures are being taken depends upon a relatively stable temperature environment inside the region to be tested. Thus the system should be calibrated for the particular fiber configuration to be used in the sensor section 10 before the probe is inserted into the test region. Subsequently, calibration need be performed only if the length or configuration of the optical fiber changes.

The fiber calibration mode is initiated by turning on standard lamp source 68 and detector 78. Standard lamp source 68 is maintained at its predetermined intensity by providing a reference voltage to optical calibration circuit 92 based upon the nominal intensity of lamp 68 which is represented by a voltage stored in CPU 120 and comparing it with the signal measured by detector 78 and converted to a voltage by U13. Any variation between the actual measured voltage and the standard reference voltage as measured by differential amplifier 91 turns on an amplifier 93 in optical calibration circuitry 92 which adjusts the light intensity of light source 68 accordingly, to bring it into coincidence with the standard intensity. Light from the standard light source 68 is injected into the optical system through lens 40 into optical coupler 38 where it travels to the input end 30 of low-temperature optical fiber 26, across air gap 34 and onto half-silvered mirror 36. The half-silvered mirror 36 reflects the light back through the low-temperature fiber 26 and into detectors 50 and 52.

Values of $I_{SC}$ and $I_M$ are measured prior to inserting the sensor section 10 into the high temperature region. After measurements begin with the sensor section 10 inserted into that region, measurement of $I_R$ is not possible because of a signal component representing radiance resulting from the output of a sensor such as emitter 22. Thus, it is necessary to calculate the radiance resulting purely from the reflection of light from light source 68 against mirror 36. This is accomplished by making a temperature reading $I_T$ prior to actuating lamp 68 and storing the reading in memory. As long as the temperature remains relatively stable, a successive reading $I_{TL}$ made with the lamp source 68 turned on may provide the basis for determining $I_R$. In this case, $I_R = I_{TL} - I_T$ and the calculated value of $I_R$ may be used in the calibration formula above.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for measuring temperature according to blackbody radiation laws within a region to be tested comprising:
    (a) sensor means responsive to the temperature within said region for transmitting light energy having an intensity generated as a function of said temperature along an optically-transmissive path;
    (b) detector and amplifier means responsive to said light energy for producing an output signal representative of said intensity; and
    (c) signal-processing means for electronically calculating from said output signal a display signal representative of a temperature corresponding to said output signal according to Planck's function wherein said signal processing means includes a memory for storing data corresponding to an arithmetic table generated from Planck's function in which predetermined ranges of said output signal correspond to predetermined temperature value increments within said table, said signal processing means further including calculating means for determining temperature value signals having successively finer resolution within said increments by calculating Planck's function for temperatures representing successive bisections of said temperature value increments.

2. The system of claim 1, further including display means for displaying a predetermined one of said temperature value signals in alpha-numeric format.

3. A system for measuring temperature within a region to be tested comprising:
    (a) sensor means responsive to the temperature within said region for transmitting light energy generated as a function of said temperature along an optically-transmissive path;
    (b) detector and amplifier means responsive to said light energy for producing an output signal representative of the intensity of said light energy;
    (c) signal-processing means for electronically calculating from said output signal a display signal representative of a temperature corresponding to said output signal according to Planck's function; and
    (d) wherein said signal-processing means includes a computer program for converting said output voltage to a first signal representing the radiance of said light energy, for matching said first signal with one of a predetermined number of temperature value increments stored within an electronic memory, and for determining said display signal by successively bisecting said one of said increments, converting said bisected increment to a second electrical signal and comparing said second electrical signal with said first electrical signal.

* * * * *

UNITED STATES PATENT AND TRADEMARK OFFICE
CERTIFICATE OF CORRECTION

PATENT NO. : 4,845,647

DATED : July 4, 1989

INVENTOR(S) : RAY R. DILS and ALAN K. WINSLOW

It is certified that error appears in the above-identified patent and that said Letters Patent is hereby corrected as shown below:

Column 7, line 46 delete "as" and insert --a--.

Column 9, line 47 underline "Gain and Bandwidth Control".

Column 9, line 55 delete "present" and insert --preset--.

Column 10, line 24 underline "Mode Control"

Column 11, line 37 delete "( $\delta L)/\delta T$" and insert -- $\delta L/\delta T$ --.

Column 11, line 45, underline "Temperature Calculation for Single Wavelength".

Column 13, line 39 after "is" insert a colon --:--.

Column 13, line 42 after "then" insert a colon --:--.

Column 13, line 62 remove space between "298°" and "K".

Column 14, line 5 after "montonically" insert a colon --:--.

UNITED STATES PATENT AND TRADEMARK OFFICE
CERTIFICATE OF CORRECTION

PATENT NO. : 4,845,647                         Page 2 of 2

DATED : July 4, 1989

INVENTOR(S) : RAY R. DILS and ALAN K. WINSLOW

It is certified that error appears in the above-identified patent and that said Letters Patent is hereby corrected as shown below:

Column 14, line 10 after "i.e." insert a colon --:--.

Column 14, line 66 delete "Afil6" and insert --AIL8--.

Column 15, line 1 Ibid.

Colunn 15, line 39 underline "Calibration Modes".

Columnn 16, line 43 underline "Fiber Calibration Mode".

Signed and Sealed this

Twenty-second Day of September, 1992

Attest:

DOUGLAS B. COMER

Attesting Officer           Acting Commissioner of Patents and Trademarks